United States Patent
Van Den Berg

(10) Patent No.: US 7,421,977 B2
(45) Date of Patent: Sep. 9, 2008

(54) DEVICE FOR MANAGING ANIMAL TRAFFIC

(75) Inventor: Karel Van Den Berg, Bleskensgraaf (NL)

(73) Assignee: Lely Enterprises AG, Zug (CH)

( * ) Notice: Subject to any disclaimer, the term of this patent is extended or adjusted under 35 U.S.C. 154(b) by 0 days.

(21) Appl. No.: 11/402,005

(22) Filed: Apr. 12, 2006

(65) Prior Publication Data
US 2006/0231036 A1 Oct. 19, 2006

(30) Foreign Application Priority Data
Apr. 13, 2005 (NL) .................................... 1028755

(51) Int. Cl.
*A01K 1/00* (2006.01)
(52) U.S. Cl. ...................... 119/520; 119/524
(58) Field of Classification Search ................. 119/520, 119/524, 510, 14.18, 14.02, 14.03
See application file for complete search history.

(56) References Cited

U.S. PATENT DOCUMENTS

| 2,995,111 | A | | 8/1961 | Darden | |
| 3,703,884 | A | * | 11/1972 | Maddalena et al. | 119/520 |
| 4,362,127 | A | * | 12/1982 | Nielsen et al. | 119/14.03 |
| 5,203,280 | A | * | 4/1993 | Nelson | 119/14.03 |
| 5,230,299 | A | * | 7/1993 | Moreau | 119/14.03 |
| 5,392,731 | A | * | 2/1995 | Hoppman et al. | 119/14.03 |
| 5,615,637 | A | * | 4/1997 | Nelson | 119/14.03 |
| 6,357,395 | B1 | * | 3/2002 | Nilsson | 119/524 |
| 6,394,027 | B2 | * | 5/2002 | Gallagher et al. | 119/14.03 |
| 6,516,744 | B1 | * | 2/2003 | Bjork et al. | 119/14.02 |
| 6,883,461 | B2 | * | 4/2005 | Christensen | 119/14.02 |

FOREIGN PATENT DOCUMENTS

| NL | 1022700 C2 | 8/2004 |
| WO | WO 99/01025 A | 1/1999 |

* cited by examiner

*Primary Examiner*—Yvonne R. Abbott
(74) *Attorney, Agent, or Firm*—David P. Owen; Jacobus C. Rasser; Howrey LLP

(57) ABSTRACT

A device for managing animal traffic. The device is provided with a frame (2), and comprises a gate (3, 4) that is movably connected with the frame (2). There are provided operating means for opening and closing the gate (3, 4), and control means for controlling the operating means (7, 8). The device comprises a locking device (16) that is controllable by the control means for mechanically locking the gate, in the closed position of the gate, to the frame (2).

20 Claims, 2 Drawing Sheets

DEVICE FOR MANAGING ANIMAL TRAFFIC

CROSS REFERENCE TO RELATED APPLICATIONS

This application claims priority from the Netherlands Application. No. 1028755 filed on 13$^{th}$ Apr. 2005, the contents of which are hereby incorporated by reference in their entirety.

BACKGROUND OF THE INVENTION

1. Field of the Invention

The invention relates generally to a device for managing animal traffic and more particularly to a device in which the animal traffic is managed by the opening and closing of a gate. The device is particularly suited to use with farm animals.

2. Description of the Related Art

Devices are known for managing animal traffic in which a frame is provided with a gate, movably connected thereto, with an operating cylinder for opening and closing the gate, and with control means for controlling the operating cylinder. Such devices may also comprise locking devices for mechanically locking the gate in its closed position. A device of this type is known from U.S. Pat. No. 2,995,111, which discloses a device for holding an animal, which device has a front gate that is provided with a locking device and with an operating cylinder for opening the front gate after the locking device has been released.

Known devices have been found susceptible to damage by animals, particularly during their opening and closing. There is thus a particular need for an alternative device for managing animal traffic which would overcome these inconveniences.

BRIEF SUMMARY OF THE INVENTION

The present invention addresses these problems by providing a device for managing animal traffic, the device comprising a frame, a gate pivotably connected with the frame and having an open position in which an animal may pass and a closed position in which an animal is prevented from passing, an operating device comprising an actuator for moving the gate to the open position through a pre-adjustable angle between approximately 25° and approximately 65°, a control device controlling the operating device and a locking device that is controllable by the control device for mechanically locking the gate to the frame in a closed position of the gate. In this context, although reference is given to an open position of the gate, this is in fact a partially open position.

It is in particular advantageous that there are provided means, for example a stop, for preventing the gate from automatically falling back, from the open position, to its closed position, and that the actuator is no longer energized, so that the gate can be opened freely. The means for preventing the gate from automatically falling back, from the open position, to its closed position are preferably adapted in such a way that they are moved from their preventing position when the gate is pushed to beyond the partially open position. The invention is based on the insight that, when the gate is opened through a limited angle, the animal receives an indication that it is able to pass the opening which is capable of being closed by the gate. The complete opening of the gate is achieved by the animal itself, as a result of which less energy is required for opening the gate. This also prevents an animal from pushing against the gate in the closed or open position, in which case a considerable part of the exerted forces are exerted on the actuator, which may lead to the actuator being damaged. Owing to the fact that, according to the invention, the exit gate is freely operable in the partially open position, the forces exerted on the gate almost only effect the opening of the gate and do not cause damage to components.

An embodiment of a device according to the invention is characterized in that the gate is a self-closing exit gate. Owing to this, the operating device need not to be activated for closing the gate. In this manner, in case an animal is located between the gate and the frame when the gate is being closed, no forces will be exerted on the actuator.

In particular, the actuator is activated after the locking device has been unlocked, which can be detected by an appropriate device.

In order to prevent the gate from falling back from said open position to the closed position, the device is provided with a spring that is only active from an angle greater than the adjustable angle of the exit gate to draw the exit gate to its closed position.

If the actuator is a pneumatic cylinder or is operated by an electric motor or the like, unexpected loads, if any, on the gate and/or the actuator are absorbed properly.

In a further preferred embodiment of a device according to the invention, the device is provided with a detection device for detecting, in the open position, a pressure—directed from the box—on the exit gate and for supplying to the control device a pressure signal for deactivating the operating cylinder. Until now it has been customary to close the exit gate by activating the operating cylinder after a fixed period of time which is attuned to the slowest animal. This means that the exit gate is often open for an unnecessary long period of time. By deactivating, according to the invention, the operating cylinder after a pressure—directed in the direction of opening—on the exit gate has been observed, which outward pressure is caused in almost all cases by an animal going through the gate, it is possible for the gate to close immediately after an animal has passed the gate. Furthermore, the operating means can be kept in their activated position for keeping the exit gate in the open position, until a force on the gate is detected.

The device is preferably provided with an automatic milking device provided with a box comprising the frame. The device is preferably also provided with a leaving-determining device for detecting whether an animal has left the box and for supplying to the control means a leaving-determining signal for deactivating the operating cylinder. When a cow leaves the box without pushing against the exit gate, the leaving-determining device will nevertheless supply a signal for deactivating the operating cylinder, as a result of which the exit gate will close.

A further embodiment of a device according to the invention is characterized in that the device is provided with end-of-milking determining means for detecting the end of the milking and for supplying to the control means an end-of-milking determining signal for unlocking the locking device. The operating means preferably comprise an operating cylinder for moving the exit gate to an open position. In particular, the operating cylinder is activated after the locking device has been unlocked, which can be detected by a relevant device.

The invention also relates to a device for managing animal traffic, which device is provided with a frame, with a gate that is movably connected with the frame, with operating means for opening and closing the gate, and with control means for controlling the operating means, the device comprising a locking device that is controllable by the control means for mechanically locking the gate, in the closed position of the gate, to the frame, the operating means comprising an operating cylinder for moving the exit gate to an open position, wherein the device is provided with means for automatically milking an animal, the device being provided with a box comprising the frame and with end-of-milking determining means for detecting the end of the milking and for supplying to the control means an end-of-milking determining signal for unlocking the locking device.

The invention further relates to a method of automatically managing animal traffic using a device for managing animal traffic, the method comprising: providing a gate pivotably connected with a frame and locked thereto in a closed position; determining whether a particular animal may be allowed to pass the gate; automatically unlocking the gate and pivoting the gate by means of an actuator to a partially open position in which the animal is unable to pass the gate unhindered; releasing the gate from the actuator; allowing the animal to further open the gate against a bias; and closing the gate once the animal has passed.

BRIEF DESCRIPTION OF THE DRAWINGS

The features and advantages of the invention will be appreciated upon reference to the following drawings, in which.

DESCRIPTION OF ILLUSTRATIVE EMBODIMENTS

Figure 1:
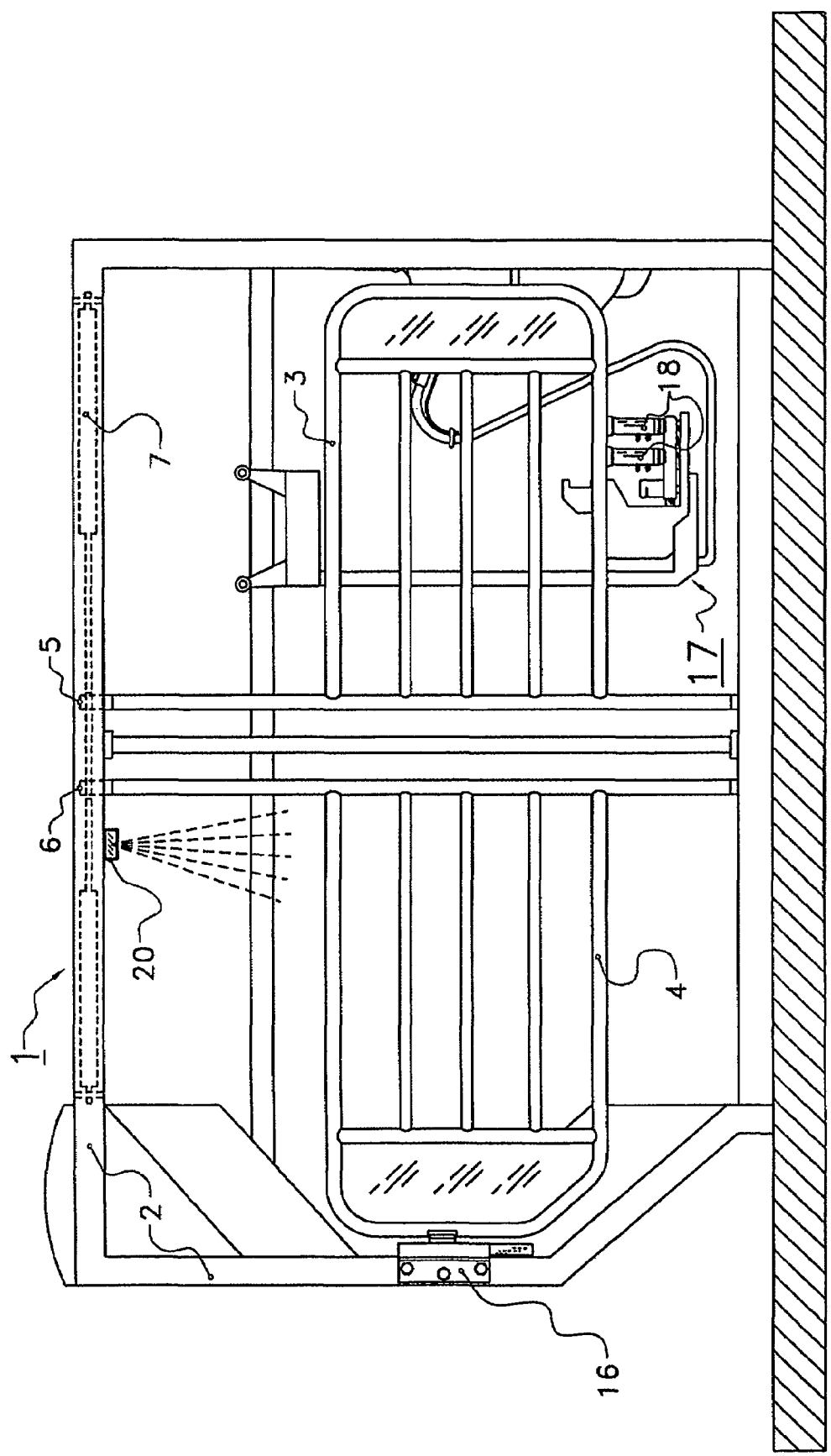
FIG. 1 is a side view of the device for automatically milking an animal according to the invention.
Figure 2:
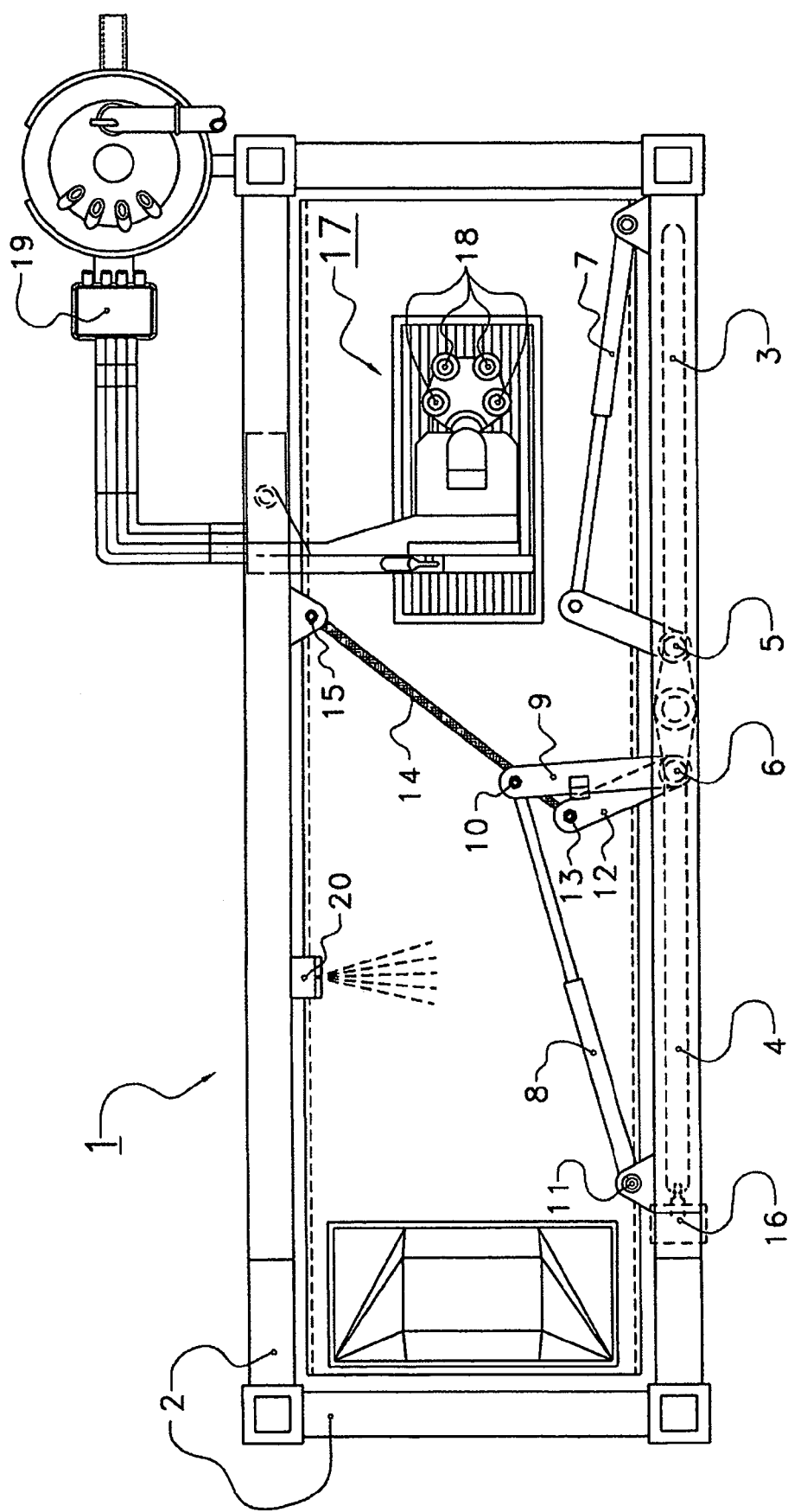
FIG. 2 is a plan view of the device.

FIG. 1 shows a side view and FIG. 2 shows a plan view of a device for automatically milking an animal according to the invention. The device is provided with a box 1 with a frame 2, which box 1 comprises an entrance gate 3 that is movably connected with the frame 2 for allowing an animal to enter the box 1 and an exit gate 4 that is movably connected with the frame 2 for allowing an animal to leave the box 1. The gates 3, 4 are disposed at one longitudinal side of the box 1 and are pivotably connected with the frame 2 via a first pivot axis 5, respectively a second pivot axis 6. It will be obvious that the invention is in general applicable to a gate to be used in animal traffic, and is not limited to a gate to be used in a box.

A first operating cylinder 7, which is disposed at the upper side of the box 1, ensures the opening and/or the closing of the entrance gate 3 under the control of a, non-shown, computer or an equivalent control device. Analogously, a second operating cylinder 8, which is disposed at the upper side of the box 1, ensures the opening and/or the closing of the exit gate 4 under the control of the computer. Although it is possible to apply hydraulic operating cylinders, from the point of view of a better absorption of forces on the operating cylinder, it is advantageous if the operating cylinders are pneumatic operating cylinders.

From the second pivot axis 6, a first drawbar 9 extends towards the middle of the box 1, a first point of engagement 10 of the second operating cylinder 8 being located near the free end of the first drawbar 9. The second point of engagement 11 of the second operating cylinder 8 is located at any rate at least in the vicinity of the plane formed by the exit gate 4 when the latter is in the closed position, as clearly shown in FIG. 2.

From the second pivot axis 6, a second drawbar 12 also extends towards the middle of the box 1, a first fastening point 13 of an elastic element 14, for example a draw spring or an elastic cord, being located near the free end of said second drawbar 12. The second fastening point 15 of the elastic element 14 is located at the side of the box 1 opposite the entrance gate and the exit gate, as clearly shown in FIG. 2. The arrangement is such that, when the second operating cylinder 8 is deactivated in the open position of the exit gate 4, the exit gate 4 is drawn to the closed position by means of the elastic element 14 itself. It will be obvious that the invention is not limited to the exemplary embodiment shown of a self-closing gate, but that other embodiments, for example making use of draw springs or an obliquely disposed pivot axis, are also applicable within the invention. In this context, in particular an embodiment is taken into consideration in which the device is provided with means for preventing the gate from automatically falling back, from the partially open position, to its closed position, and with means for deactivating the operating device after partially opening the gate, so that the gate can be opened freely. The means for preventing the gate from automatically falling back, from the partially open position, to its closed position are adapted in such a way that they are moved from their preventing position when the gate is pushed to beyond the partially open position. In an alternative embodiment, the operating cylinder can be kept in the activated position to keep the gate in the partially open position, until a force on the gate is detected, after which the operating cylinder is deactivated. This results in a reduced risk for the operating cylinder to be damaged by external forces.

On the frame 2 of the box 1 there is disposed a locking device 16 that is controllable by the control means for mechanically locking the exit gate 4, in the closed position of the exit gate 4, to the frame 2. Thus it is prevented that forces that are exerted on the exit gate 4 in the closed position are transferred to the frame 2, as a result of which the second operating cylinder 8 is saved. The unlocking of the locking device 16 takes placed in a controlled manner, which can be performed, for example, in an electromagnetic, hydraulic, pneumatic or equivalent manner.

The functioning of the device for milking an animal will be explained hereinafter in further detail. When an animal, for example a cow, is located in the box 1 and the gates 3, 4 are in the closed position, teat cups 18 are connected to the teats of the animal with the aid of a milking robot 17 known per se, after which the milking of the animal takes place. When the milking has ended, which is detected with the aid of end-of-milking determining means 19 known per se, for example constituted by a milk flow meter, an end-of-milking determining signal is supplied to the control means for unlocking the locking device 16. After the locking device 16 has been unlocked, the second operating cylinder 8 is activated for moving the exit gate 4 to an open position. The exit gate 4 is preferably pivoted to the open position by means of the second operating cylinder 8 through a pre-adjustable angle between approximately 25° and approximately 65°.

The exit gate 4 is kept in the open position by keeping the second operating cylinder 8 in the activated position. When a pressure—directed from the box 1—on the exit gate 4 is detected, for example by a detection device integrated, for example, in the second operating cylinder, or alternatively a separate detection device, a pressure signal is supplied to the control device for deactivating the second operating cylinder 8. With the aid of the elastic element 14, after the animal has passed, the exit gate 4 can be drawn to the closed position in which the exit gate 4 is locked by means of the locking device 16. It will be obvious that, alternatively, the control means are adapted to supply, when the exit gate 4 is in the open position, a signal for energizing the operating cylinder 8 in such a way that an animal is able to open itself the exit gate 4 by pushing, and/or to supply, when the exit gate 4 is in the open position, a signal for further opening the exit gate 4.

Should an animal leave the box 1 without pushing against the exit gate 4, a leaving-determining device 20, for example an ultrasonic sensor, supplies a leaving-determining signal for deactivating the second operating cylinder 8, as a result of which the exit gate 4 will close.

Thus, the invention has been described by reference to certain embodiments discussed above. It will be recognized that these embodiments are susceptible to various modifications and alternative forms well known to those of skill in the art. Many modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A device for managing animal traffic, the device comprising:
   a frame;
   a gate pivotably connected with the frame and having an open position in which an animal may pass and a closed position in which an animal is prevented from passing;
   an operating device comprising an actuator for moving the gate to a partially open position through a pre-adjustable angle between approximately 25° and approximately 65°, the gate being freely moveable by an animal in the partially open position;
   a control device controlling the operating device; and
   a locking device that is controllable by the control device for mechanically locking the gate to the frame in the closed position of the gate.

2. A device as claimed in claim 1, wherein the gate is a self-closing exit gate.

3. A device as claimed in claim 2, wherein the device is provided with a spring that is only active from an angle greater than the adjustable angle of the exit gate to draw the exit gate to its closed position.

4. A device as claimed in claim 1, wherein the actuator is a pneumatic cylinder or an electric motor or the like.

5. A device as claimed in claim 1, wherein the device comprises an automatic milking device and the frame comprises part of a milking box.

6. A device as claimed in claim 5, wherein the device comprises an end-of-milking determining system for detecting the end of the milking and for supplying to the control device an end-of-milking determining signal for unlocking the locking device.

7. A device as claimed in claim 5, wherein the device is provided with a leaving-determining device for detecting whether an animal has left the box and for supplying to the control device a leaving-determining signal for deactivating the actuator.

8. A device as claimed in claim 1, the device further comprising:
   a milking box comprising the frame and wherein the gate is an exit gate by which an animal may exit the box; and
   an automatic milking device comprising an end-of-milking determining system for detecting the end of the milking and for supplying to the control device an end-of-milking determining signal for unlocking the locking device.

9. A device as claimed in claim 8, wherein the device further comprises a leaving-determining device for detecting whether an animal has left the box and for supplying to the control device a leaving-determining signal for deactivating the actuator.

10. A device as claimed in claim 8, wherein the exit gate is pivotably connected with the frame, and in that the operating cylinder is pivotable to the open position through a pre-adjustable angle between approximately 25° and approximately 65°.

11. A device as claimed in claim 10, wherein the gate is a self-closing exit gate.

12. A device as claimed in claim 11, wherein the device is provided with a spring that is only active from an angle greater than the pre-adjustable angle of the exit gate to draw the exit gate to its closed position.

13. A device as claimed in claim 8, wherein the actuator is a pneumatic cylinder or an electric motor or the like.

14. A device as claimed in claim 1, wherein the control device is adapted to supply to the operating device a deactivation signal for deactivating the actuator when the exit gate is in the open position.

15. A device as claimed in claim 14, wherein the device comprises a detection device for detecting, in the open position, a pressure—directed in the direction of opening—on the exit gate, and for supplying to the control device a pressure signal for generating the deactivation signal.

16. A device as claimed in claim 1, wherein the device comprises means for preventing the gate from automatically falling back from the open position to its closed position, and means for deactivating the actuator after partially opening the gate, so that the gate can be further opened freely.

17. A device as claimed in claim 16, wherein the means for preventing the gate from automatically falling back from the open position to its closed position are moved from their preventing position when the gate is pushed to beyond the partially open position.

18. A method of automatically managing animal traffic using a device for managing animal traffic according to claim 1, the method comprising:
   determining whether a particular animal may be allowed to pass the gate;
   automatically unlocking the gate and pivoting the gate by means of the actuator to a partially open position in which the animal is unable to pass the gate unhindered;
   releasing the gate from the actuator;
   allowing the animal to further open the gate against a bias; and
   closing the gate once the animal has passed.

19. A device for managing animal traffic, the device comprising:
   a frame;
   a gate pivotably connected with the frame and having an open position in which an animal may pass and a closed position in which an animal is prevented from passing;
   an operating device comprising an actuator for moving the gate to the open position through a pre-adjustable angle between approximately 25° and approximately 65°;
   a control device controlling the operating device; and
   a locking device that is controllable by the control device for mechanically locking the gate to the frame in the closed position of the gate, wherein when the gate is in the open position, the control device is adapted to supply: a deactivation signal to the operating device for deactivating the actuator; or an energizing signal for energizing the actuator in such a way that an animal is able to further open itself the exit gate by pushing; or a further opening signal for further opening the exit gate.

20. A device as claimed in claim 19, wherein the device is provided with a detection device for detecting, in the open position, a pressure—directed in the direction of opening—on the exit gate, and for supplying to the control device a pressure signal for generating the deactivation signal.

* * * * *